United States Patent
Sherwood et al.

(10) Patent No.: US 8,639,815 B2
(45) Date of Patent: Jan. 28, 2014

(54) SELECTING A PRIMARY-SECONDARY HOST PAIR FOR MIRRORING VIRTUAL MACHINES

(75) Inventors: David Sherwood, Manchester (GB); Robert John Wallis, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 13/222,385

(22) Filed: Aug. 31, 2011

(65) Prior Publication Data
US 2013/0054807 A1 Feb. 28, 2013

(51) Int. Cl.
*G06F 15/173* (2006.01)
(52) U.S. Cl.
USPC .......................................... 709/226; 709/223
(58) Field of Classification Search
USPC ................................................ 709/220–226
See application file for complete search history.

(56) References Cited

U.S. PATENT DOCUMENTS

| | | | |
|---|---|---|---|
| 7,289,433 B1 | 10/2007 | Chmara et al. | |
| 7,617,369 B1 | 11/2009 | Bezbaruah et al. | |
| 7,702,947 B2 * | 4/2010 | Peddada | 714/4.1 |
| 7,715,308 B2 | 5/2010 | Ramaswamy | |
| 8,321,862 B2 * | 11/2012 | Swamy et al. | 718/1 |
| 2005/0132379 A1 | 6/2005 | Sankaran et al. | |
| 2005/0240677 A1 * | 10/2005 | Liu et al. | 709/231 |
| 2007/0180314 A1 * | 8/2007 | Kawashima et al. | 714/15 |
| 2010/0077250 A1 | 3/2010 | Koh et al. | |
| 2010/0095004 A1 * | 4/2010 | Zuckerman et al. | 709/226 |
| 2010/0325110 A1 | 12/2010 | Tantrum | |

\* cited by examiner

*Primary Examiner* — Joshua Joo
(74) *Attorney, Agent, or Firm* — Yudell Isidore Ng Russell PLLC

(57) ABSTRACT

A system and a computer program product for selecting a primary-secondary host pair for mirroring virtual machines. The system includes a processor collecting data related to each of a plurality of potential primary-secondary host pairs in a computer network. The processor analyzes each of the plurality of potential primary-secondary host pairs in the computer network utilizing performance metrics. An ideal primary-secondary host pair in the computer network is determined by the processor based on the analysis of the performance metrics of each of the plurality of potential primary-secondary host pairs. In response to determining the ideal primary-secondary host pair, a primary host virtual machine is mirrored onto the secondary host of the primary-secondary host pair.

20 Claims, 5 Drawing Sheets

SELECTING A PRIMARY-SECONDARY HOST PAIR FOR MIRRORING VIRTUAL MACHINES

BACKGROUND

1. Technical Field

The present invention generally relates to computer systems. More specifically, the present invention relates to selecting a primary-secondary host pair for mirroring virtual machines.

2. Description of the Related Art

High-availability computer systems use redundant computers to provide a continuity of services as provided by the computer system in the event of a hardware failure. In a virtual machine environment, a virtual machine operating on a primary computer periodically mirrors its processor and memory states onto one or more backup computers. This mirroring process ensures that the virtual machine continues operating on at least one of the backup computers in case of a hardware failure of the primary computer. When high-availability functionality is activated on the virtual machine operating on the primary computer, the primary computer queries one or more backup computers regarding their available resources, and the primary computer requests to mirror its virtual machine onto at least one backup computer that has sufficient resources to support the virtual machine.

BRIEF SUMMARY

Disclosed are a system and a computer program product for selecting a primary-secondary host pair for mirroring virtual machines.

The system includes a processor collecting data related to each of a plurality of potential primary-secondary host pairs in a computer network. The processor analyzes each of the plurality of potential primary-secondary host pairs in the computer network utilizing performance metrics. The ideal primary-secondary host pair in the computer network is determined by the processor based on the analysis of each of the plurality of potential primary-secondary host pairs. In response to determining the ideal primary-secondary host pair, a primary host virtual machine is mirrored onto the secondary host of the primary-secondary host pair. Using performance metrics to intelligently determine the ideal primary-secondary host pair enables a high-availability computer system to realize performance and reliability gains that are not achievable when selecting a primary-secondary host pair based simply on whether a backup computer has sufficient resources to support a virtual machine.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, system and computer program product for selecting a primary-secondary host pair for mirroring virtual machines. Data related to each of a plurality of potential primary-secondary host pairs in a computer network is collected. Using performance metrics, each of the plurality of potential primary-secondary host pairs in the computer network is analyzed. The ideal primary-secondary host pair in the computer network is determined. Once the ideal primary-secondary host pair is determined, a primary host virtual machine is mirrored onto the secondary host. By using performance metrics to intelligently determine the ideal primary-secondary host pair, a high-availability computer system can realize performance and reliability gains that are not achievable when selecting a primary-secondary host pair based simply on whether a backup computer has sufficient resources to support a virtual machine.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
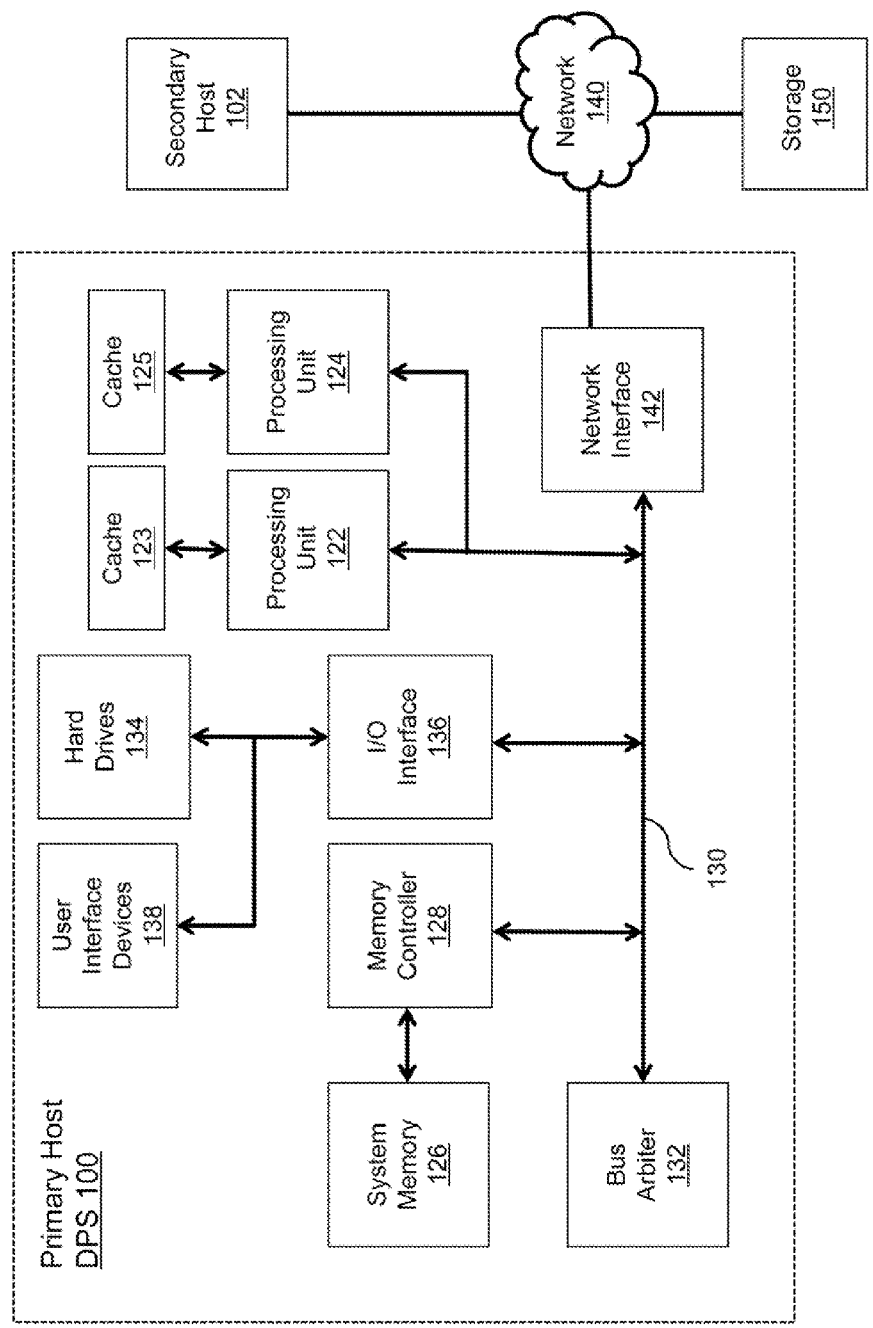
FIG. 1 provides a block diagram representation of an example data processing system within which one or more of the described embodiments are practiced.

With reference now to the figures, and beginning with FIG. 1, there is depicted a block diagram representation of an example data processing system (DPS), as utilized within one embodiment. The data processing system is described as having features common to a server computer. However, as used herein, the term "data processing system," is intended to include any type of computing device or machine that is capable of receiving, storing and running a software product including not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the described embodiments. While embodiments will be described in the general context of instructions residing on hardware within a server computer, those skilled in the art will recognize that embodiments may be implemented in a combination of program modules running in an operating system. Generally, program modules include routines, programs, components, and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

It is appreciated that the computing environment in which the described embodiments can be practice can be referred to as a cloud computing environment. Cloud computing refers to Internet-based computing where shared resources, software, and information are provided to users of computer systems and other electronic devices (e.g., mobile phones) on demand, similar to the electricity grid. Adoption of cloud computing has been aided by the widespread utilization of virtualization, which is the creation of a virtual (rather than actual) version of something, e.g., an operating system, a server, a storage device, network resources, etc. A virtual machine (VM) is a software implementation of a physical machine (e.g., a computer system) that executes instructions like a physical machine. VMs are usually categorized as system VMs or process VMs. A system VM provides a complete system platform that supports the execution of a complete operating system (OS). In contrast, a process VM is usually designed to run a single program and support a single process. A VM characteristic is that application software running on the VM is limited to the resources and abstractions provided by the VM. System VMs (also referred to as hardware VMs) allow the sharing of the underlying physical machine resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing websites (e.g., via the Internet or a private corporate network) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

Referring again to FIG. 1, a primary host such as DPS 100 can include one or more processing units 122 and 124, a system memory 126 coupled to a memory controller 128, and a system interconnect fabric 130 that couples memory controller 128 to processing unit(s) 122 and 124 and other components of primary host DPS 100. Interconnect fabric 130 in an embodiment can be an address and data bus. Commands on system interconnect fabric 130 are communicated to various system components under the control of bus arbiter 132.

Primary host DPS 100 can further include cache memory 123 and 125 for high speed storage of frequently used data. Cache memory 123 can be connected to or communicatively coupled with processor 122. While cache memory 123 and 125 are shown operatively connected to processors 122 and 124, cache memory 123 and 125 can also operatively be a part of system memory 126.

Primary host DPS 100 further includes computer readable storage media, such as one or more hard disk drives 134. Disk drives 134 provide nonvolatile storage for primary host DPS 100. Primary host DPS 100 also includes one or more user interface devices 138. User interface devices 138 allow a user to provide input and receive output from primary host DPS 100. For example, user interface devices 138 can include displays, keyboards and pointing devices such as a mouse. Disk drives 134 and user interface devices 138 can be communicatively coupled to system interconnect fabric 130 by an input-output (I/O) interface 136. Although the description of computer readable storage media above refers to a hard disk, it should be appreciated by those skilled in the art that other types of media which are readable by a computer, such as removable magnetic disks, CD-ROM disks, magnetic cassettes, flash memory cards, digital video disks, Bernoulli cartridges, and other later-developed hardware, may also be used in the exemplary computer operating environment.

Primary host DPS 100 may operate in a networked environment using logical connections to one or more remote computers or hosts, such as secondary host 102. Secondary host 102 may be a computer, a server, a router or a peer device and typically includes many or all of the elements described relative to primary host DPS 100. In a networked environment, program modules employed by primary host DPS 100, or portions thereof, may be stored in a remote memory storage device 150. The logical connections depicted in FIG. 1 can include connections over a network 140. In an embodiment, network 140 may be a local area network (LAN). In alternative embodiments, network 140 may include a wide area network (WAN). Primary host DPS 100 is connected to network 140 through an input/output interface, such as a network interface 142. It will be appreciated that the network connections shown are exemplary and other means of establishing a communications link between the computers may be used.

Figure 2:
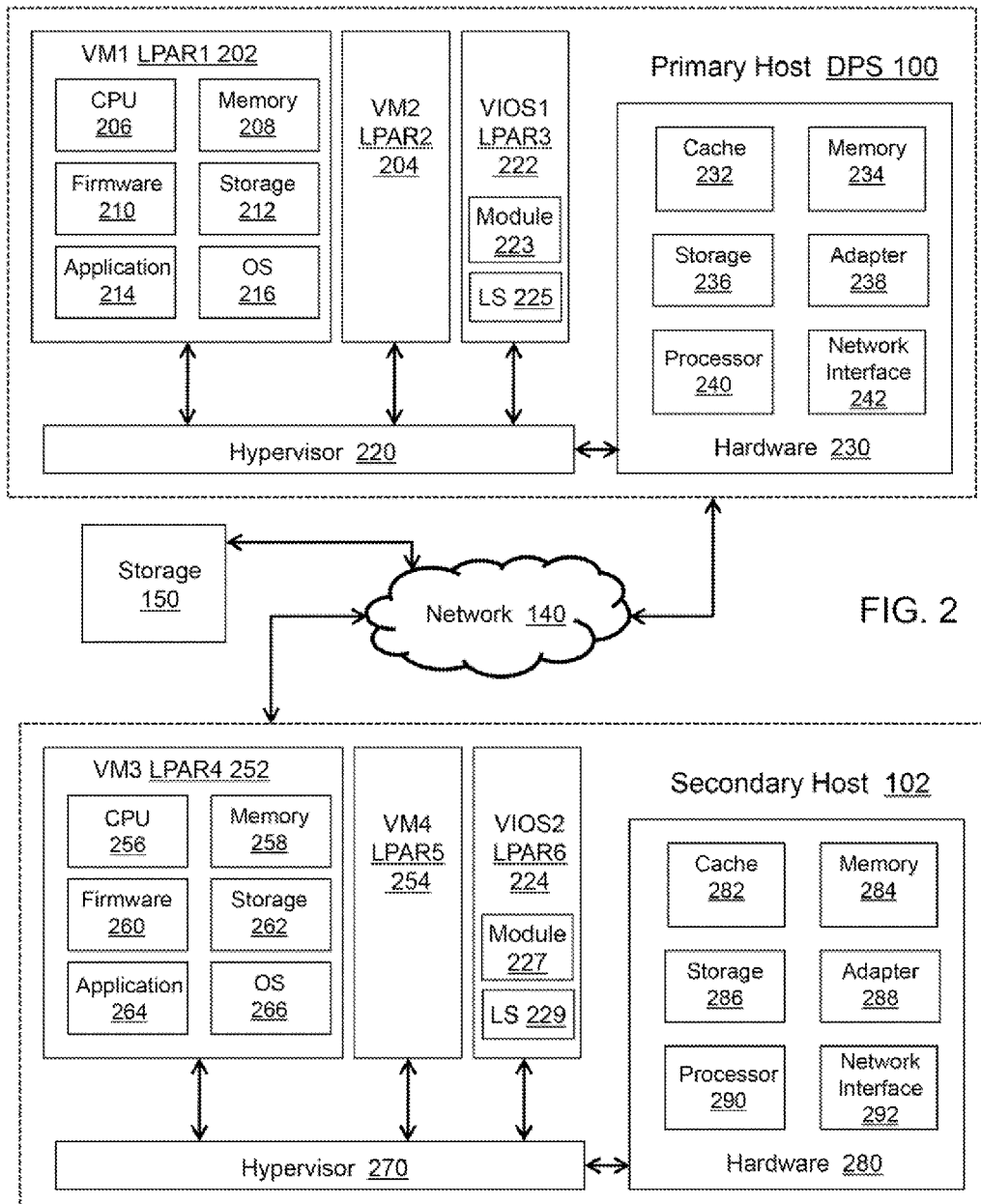
FIG. 2 illustrates a block diagram representation of virtual machines and virtual I/O servers operating on primary and secondary host data processing systems according to one embodiment.

FIG. 2 illustrates multiple virtual machines and virtual I/O servers operating on a primary and a secondary host data processing system in a logically partitioned system according to an embodiment. Primary host DPS 100 includes several logical partitions (LPAR) such as LPAR1 202, LPAR2 204, and LPAR3 222. In the embodiment illustrated in FIG. 2, LPAR1 202 and LPAR2 204 are virtual machines (VM1 and VM2), and LPAR3 222 is a virtual I/O server (VIOS1). The VIOS, such as VIOS1, is a communications gateway between each of the virtual machine LPARs (LPAR1 202 and LPAR2 204) and an external network, for example by way of hardware I/O devices within the primary host DPS 100, and communication between the VIOS1 and each of VM1 and VM2 is through the hypervisor 220. While three logical partitions including two virtual machines and one VIOS are shown, many additional logical partitions including many additional virtual machines or virtual I/O servers can be provided in DPS 100. For example, since the VIOS1 serves as an important communications link between each of VM1/VM2 and an external network, a plurality of virtual I/O servers may be used to provide redundancy. Each of logical partitions LPAR1 202, LPAR2 204, and LPAR3 222 comprises a division of the computing capabilities or resources of the primary host DPS 100.

Primary host DPS 100 further includes hardware 230 upon which logical partitions LPAR1 202, LPAR2 204, and LPAR3 222 are implemented. Hardware 230 comprises one or more processing units or processors 240, cache memory 232, one or more memories 234, one or more storage devices 236 such as a hard drive, one or more input output adapters 238, including small computer system interface (SCSI) devices, and one or more network interfaces 242. Hypervisor 220 is in communication with hardware 230. Hypervisor 220 allows multiple operating systems and applications to share a single hardware host. Hypervisor 220 controls the operation of hardware 230 including processor 240 and other system resources by allocating resources to each logical partition.

Each virtual machine LPAR, such as example LPAR1 202, comprises a virtual central processing unit (CPU) or processor 206, virtual memory 208, virtual firmware 210 and virtual storage 212. LPAR1 202 further includes functional modules or software modules such as virtual operating system (OS) 216 and application software 214. Application software 214 is executed by processor 206 within logical partition LPAR1 202. LPAR1 202 and LPAR2 204 operate under the control of hypervisor 220. Each LPAR can communicate with hypervisor 220 and with each other through hypervisor 220. Hypervisor 220 manages interaction between and allocates resources to logical partitions LPAR1 202 and LPAR2 204 including processor resources such as virtual processor 206. Hypervisor 220 controls the operation of LPAR1 202 and LPAR2 204, allowing multiple operating systems to run, unmodified, at the same time on primary host DPS 100, and provides a measure of robustness and stability to the system. Each operating system within the hypervisor operates independently of the others, such that if one operating system experiences a failure, the other operating systems can continue working without interruption.

Each VIOS LPAR such as example LPAR3 222 comprises a virtual processor and includes VIOS software executed by the virtual processor within logical partition LPAR3 222. The VIOS software executed within logical partition LPAR3 222 provides a functionality that includes managing the sharing of physical I/O resources, such as input output adapters 238, among each of the virtual machine LPARs, such as LPAR1 202 and LPAR2 204. The VIOS also provides a SCSI for each of LPAR1 202 and LPAR2 204, such that LPAR1 202 and LPAR2 204 can share SCSI devices such as SCSI devices included within input output adapters 238. LPAR3 222 also includes a pair selection module 223 and local storage (LS) 225. The pair selection module 223 executes at the virtual processor within logical partition LPAR3 222 to perform functions related to the selection of a primary-secondary host pair for mirroring virtual machines, as described below with reference to FIGS. 3-5. For example, the pair selection module 223 provides a functionality that includes collecting network related data, such as network latency between pairs of computer systems communicating over a network. In some embodiments, as used herein, the term "latency" includes consideration of bandwidth and distance between host devices, such as bandwidth and distance between pairs of computer systems communicating over the network.

Similarly, secondary host 102 can include several logical partitions (LPAR) such as LPAR4 252, LPAR5 254, and LPAR6 224. In the embodiment illustrated in FIG. 2, LPAR4 252 and LPAR5 254 are virtual machines (VM3 and VM4), and LPAR6 224 is a virtual I/O server (VIOS2). The VIOS, such as VIOS2, is a communications gateway between each of the virtual machine LPARs (LPAR4 252 and LPAR5 254) and an external network, for example by way of hardware I/O devices within the secondary host 102, and communication between the VIOS2 and each of VM3 and VM4 is through the hypervisor 270. While three logical partitions including two virtual machines and one VIOS are shown, many additional logical partitions including many additional virtual machines or virtual I/O servers can be provided in secondary host 102. For example, since the VIOS2 serves as an important communications link between each of VM3/VM4 and an external network, a plurality of virtual I/O servers may be used to provide redundancy. Each of logical partitions LPAR4 252, LPAR5 254, and LPAR6 224 comprises a division of the computing capabilities or resources of the secondary host 102.

Secondary host 102 further includes hardware 280 upon which logical partitions LPAR4 252, LPAR5 254, and LPAR6 224 are implemented. Hardware 280 has a processing unit or processer 290, cache memory 282, memory 284, storage 286 such as a hard drive, an input output adapter 288, including small computer system interface (SCSI) devices, and a network interface 292. Hypervisor 270 is in communication with hardware 280. Hypervisor 270 allows multiple operating systems and applications to share a single hardware host. Hypervisor 270 controls the operation of hardware 280 including processor 290 and other system resources by allocating resources to each logical partition. Network 140 provides communications between primary host DPS 100 and secondary host 102. Network 140 allows hypervisors 220 and 270 to communicate with each other and to transfer data and operating parameters from primary host DPS 100 to secondary host 102.

Each virtual machine LPAR such as LPAR4 252 comprises a virtual processor 256, virtual memory 258, virtual firmware 260 and virtual storage 262. LPAR4 252 further includes functional modules or software modules such as virtual operating system (OS) 266 and application software 264. Application software 264 is executed within logical partition LPAR4 252. LPAR4 252 and LPAR5 254 operate under the control of hypervisor 270. Each LPAR can communicate with each other and with hypervisor 270. Hypervisor 270 manages interaction between and allocates resources between logical partitions LPAR4 252 and LPAR5 254 and virtual processors such as virtual processor 256. Hypervisor 270 controls the operation of LPAR4 252 and LPAR5 254 and allows multiple operating systems to run, unmodified, at the same time on secondary host 102 and provides a measure of robustness and stability to the system. Each operating system within the hypervisor operates independently of the others, such that if one operating system experiences a failure, the other operating systems can continue working without interruption.

Each VIOS LPAR such as example LPAR6 224 comprises a virtual processor and includes VIOS software executed by the virtual processor within logical partition LPAR6 224. The VIOS software executed within logical partition LPAR6 224 provides a functionality that includes managing the sharing of physical I/O resources, such as input output adapters 288, among each of the virtual machine LPARs, such as LPAR4 252 and LPAR5 254. The VIOS also provides a SCSI for each of LPAR4 252 and LPAR5 254, such that LPAR4 252 and LPAR5 254 can share SCSI devices such as SCSI devices included within input output adapters 288. LPAR6 224 also includes a pair selection module 227 and LS 229. The pair selection module 227 executes at the virtual processor within logical partition LPAR6 224 to perform functions related to the selection of the primary-secondary host pair for mirroring virtual machines, as described below with reference to FIGS. 3-5. For example, the pair selection module 227 provides a functionality that includes collecting network related data, such as network latency between pairs of computer systems, for example between primary host DPS 100 and secondary host 102 communicating over the network 140.

Those of ordinary skill in the art will appreciate that the hardware components and basic configuration depicted in FIG. 1 and FIG. 2 may vary. The illustrative components within primary host DPS 100 and secondary host 102 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 and FIG. 2 may be, for example, an IBM eServer pSeries system, a product of International Business Machines Corporation in Armonk, N.Y., running the Advanced Interactive Executive (AIX) operating system (Trademark of IBM Corporation) or LINUX operating system (Trademark of Linus Torvalds).

Figure 3:
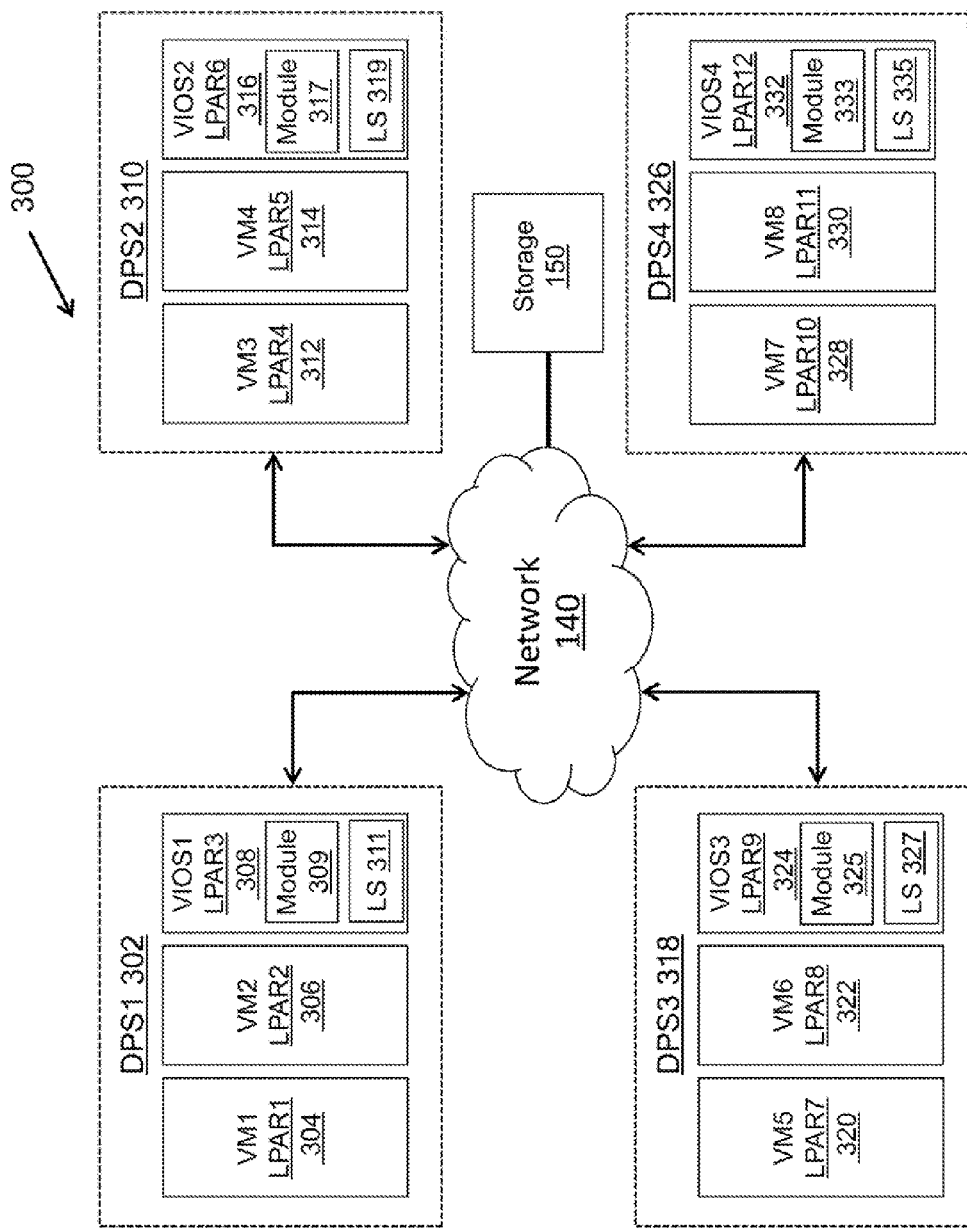
FIG. 3 is a block diagram of a computer network comprising a plurality of data processing systems, each having at least one virtual I/O server, that are interconnected over a network.

FIG. 3 illustrates a computer network 300 comprising a plurality of data processing systems (DPS) DPS1 302, DPS2 310, DPS3 318, and DPS4 326 that are interconnected over the network 140. In the discussion of FIG. 3, reference is also made to elements described in FIG. 1 and FIG. 2. Each of DPS1 302, DPS2 310, DPS3 318, and DPS4 326 include a logically partitioned system that comprises a division of the computing capabilities or resources of their respective data processing system. DPS1 302 includes several logical partitions (LPAR) such as LPAR1 304, LPAR2 306, and LPAR3 308. In the embodiment illustrated in FIG. 3, LPAR1 304 and LPAR2 306 are virtual machines (VM1 and VM2), and LPAR3 308 is a virtual I/O server (VIOS1). DPS2 310 also includes several logical partitions (LPAR) such as LPAR4 312, LPAR5 314, and LPAR6 316. In the embodiment shown in FIG. 3, LPAR4 312 and LPAR5 314 are virtual machines (VM3 and VM4), and LPAR6 316 is a virtual I/O server (VIOS2). DPS3 318 includes several logical partitions (LPAR) such as LPAR7 320, LPAR8 322, and LPAR9 324. In the embodiment illustrated in FIG. 3, LPAR7 320 and LPAR8 322 are virtual machines (VM5 and VM6), and LPAR9 324 is a virtual I/O server (VIOS3). DPS4 326 includes several logical partitions (LPAR) such as LPAR10 328, LPAR11 330, and LPAR12 332. In the embodiment illustrated in FIG. 3, LPAR10 328 and LPAR11 330 are virtual machines (VM7 and VM8), and LPAR12 332 is a virtual I/O server (VIOS4).

Network 140 allows hypervisors (not shown) in each of DPS1 302, DPS2 310, DPS3 318, and DPS4 326 to communicate with each other and to transfer data and operating parameters amongst each other. Also, program modules employed by any of DPS1 302, DPS2 310, DPS3 318, and DPS4 326, or portions thereof, may be stored in a remote memory storage device 150. As shown, LPAR3 308 (VIOS1) includes a pair selection module 309 and LS 311, LPAR6 316 (VIOS1) includes a pair selection module 317 and LS 319, LPAR9 324 (VIOS3) includes a pair selection module 325 and LS 327, and LPAR12 332 (VIOS4) includes a pair selection module 333 and LS 335. The pair selection modules 309, 317, 325, and 333 execute at the virtual processor within their respective logical partition to perform functions related to the selection of the primary-secondary host pair for mirroring virtual machines, as described herein. For example, each of the pair selection modules 309, 317, 325, and 333 provide a functionality that includes collecting data related to the computer network 300, such as network latency between pairs of data processing systems, for example between any pair of data processing systems including at least two of DPS1 302, DPS2 310, DPS3 318, and DPS4 326 communicating over the network 140. Generally, each of VIOS1, VIOS2, VIOS3, and VIOS4 can communicate with each other over the network 140 by way of the hypervisors within each of DPS1 302, DPS2 310, DPS3 318, and DPS4 326 to collect data related to network latency, available network resources, network topology, and resource utilization data, among others.

In some embodiments, the computer network 300 is equivalently referred to as a "cluster", and each of the data processing systems DPS1 302, DPS2 310, DPS3 318, and DPS4 326 are referred to as "nodes". In a high-availability computer system, redundant data processing systems or redundant nodes are used to provide a continuity of services in the event of a hardware failure. Moreover, for purposes of the present disclosure, the set of virtual I/O servers (VIOS1, VIOS2, VIOS3, and VIOS4) that communicate with each other over the network 140 is at times referred to as a "VIOS cluster". Each VIOS also includes software that when executed by a processor provides the functionality necessary to work in a cluster and be able to transfer cluster-related data (e.g., latency, bandwidth, etc.) to another VIOS in the cluster. By way of example, consider that DPS1 302 is the primary host computer for a virtual machine such as LPAR1 304 (VM1) that runs on DPS1 302. In a high-availability virtual machine environment, a virtual machine such as VM1 running on DPS1 302 copies or "mirrors" its processor and memory states onto one or more backup computers at periodically recurring points called "checkpoints". As described herein, the "backup computer" is equivalently referred to as a "secondary host computer" or "secondary host". Also, a "processor state" refers to the operating condition of the processor. For example, a processor can be in an operating state, a halt state or a sleep state. This mirroring process ensures that the VM1 continues operating on at least one of the backup computers in case of a hardware failure of the primary host computer DPS1 302.

Often, a challenge is presented regarding how to choose an appropriate secondary host. Generally, the challenge includes how to choose an appropriate primary-secondary host computer system pair. A naïve solution is to have the primary host computer DPS1 302 query one or more potential secondary host computers connected to the network 140, such as DPS2 310, DPS3 318, and DPS4 326, regarding their available resources, and have the primary host computer DPS1 302 mirror VM1 onto any of DPS2 310, DPS3 318, and DPS4 326 that has sufficient resources to support VM1. However, such a method does not consider the operational efficiency of simply pairing the primary host computer DPS1 302 to the one of DPS2 310, DPS3 318, and DPS4 326 that has sufficient resources to support VM1. In some cases, the network 140 connection between the primary host computer DPS1 302 and the selected secondary host computer can have a low bandwidth, adversely affecting performance of the virtual machine (VM1) because checkpoints encountered during the mirroring process will take longer to complete.

Also, selecting a secondary host computer for mirroring the virtual machine (VM1) from the primary host computer DPS1 302 based solely on whether the secondary host computer is technically capable of supporting the virtual machine (VM1) does not consider the suitability of the secondary host computer to assume its new role as the primary host computer in the event of a hardware failure of the current primary host computer DPS1 302. For example, when the secondary host computer assumes its new role as the primary host computer, the secondary host computer should be able to establish a new secondary host computer such that the new primary-secondary host computer system pair can continue functioning as a checkpoint-based high-availability system. Also, in one embodiment, any new secondary host computer should be able to efficiently handle the possibility of one or more virtual machines from one or more primary host computers being concurrently moved to the new secondary host computer.

To overcome such challenges, in an embodiment, the pair selection modules 309, 317, 325, and 333 within the VIOS cluster are used to collect information regarding the computer network 300, and the collected information is used to intelligently determine the ideal primary-secondary host pair. Thus, a high-availability computer system, such as is implemented within the computer network 300, can realize performance and reliability gains that are not achievable when selecting a primary-secondary host pair based simply on whether a potential secondary host computer has sufficient resources to support a virtual machine. As described below, there are many ways to advantageously utilize the functionality and data collection capability of the VIOS cluster for the selection of an ideal primary-secondary host pair.

For example, the pair selection modules 309, 317, 325, and 333 can use data related to computer network 300 such as latency, available network resources, network topology, and resource utilization data, among others, to find an ideal secondary host computer for a given primary host computer, such as when a virtual machine is already running on a designated primary host computer. In some embodiments, each of the pair selection modules 309, 317, 325, and 333 may be equivalently referred to as a "third-party" that is tasked with finding the ideal secondary host computer. Thus, the third-party automates the process of selecting the ideal secondary host computer.

In addition to the pair selection modules 309, 317, 325, and 333, the third-party may include one or more software modules within a virtual machine or hypervisor, where the one or more software modules has appropriate knowledge of the topology of the computer network 300 as well as of the workload of each of the data processing systems DPS1 302, DPS2 310, DPS3 318, and DPS4 326 within the computer network 300. The third-party can therefore use the data collected by the VIOS cluster to intelligently select a secondary host computer and thus determine the ideal primary-secondary host pair. In one embodiment, an application programming interface (API) is provided to grant access to the third-party to data collected by the VIOS cluster and thus enable searching by the third-party for the ideal primary-secondary host pair. In one embodiment, the data collected by VIOS cluster, for example by the pair selection modules 309, 317, 325, and 333, is stored in the remote memory storage device 150. Further, information regarding primary-secondary host pairs can be stored in the storage device 150 and provided to each of VIOS1, VIOS2, VIOS3, and VIOS4 for the purpose of providing a continuity of services in the event of a virtual machine failure or a hardware failure.

In another embodiment, computer network 300 latency data collected by the VIOS cluster is used as the criteria for selecting an ideal secondary host computer for a given primary host computer, such as when a virtual machine is already running on a designated primary host computer. For example, if two of more potential secondary host computers all have sufficient spare resources to act as the secondary host, then the network latency between the primary host computer and each of the potential secondary hosts is used to distinguish between the two or more potential secondary host computers. Thus, the potential secondary host having the lowest network latency to the primary host computer system is chosen to act as the secondary host. Consider, for example, a virtual machine VM1 running on DPS1 302, that is designated as the primary host computer. If two of more potential secondary host computers, such as DPS2 310, DPS3 318, and DPS4 326, have sufficient spare resources to act as the secondary host computer, then the secondary host is selected based on which of the potential secondary host computers have the lowest network latency to the primary host computer system DPS1 302.

Another method of using data collected by the VIOS cluster for the selection of the ideal primary-secondary host pair includes analyzing the resource utilization data for each VIOS (VIOS1, VIOS2, VIOS3, and VIOS4) in the computer network 300 and using such data as a criteria to assess the suitability of a given data processing system to act as the secondary host computer. For example, a potential secondary host computer may be capable of supporting mirroring a virtual machine running on a primary host computer, and the potential secondary host computer may also be capable of running the virtual machine if the virtual machine fails over from the primary host computer. However, the potential secondary host computer may perform such roles only at the expense of reducing the bandwidth of the computer network, or a disk I/O bandwidth, of one or more virtual machines running on the potential secondary host, past a defined minimum threshold. In some embodiments, use of the VIOS resource utilization data as a criteria for selecting an ideal secondary host computer can be implemented by querying the VIOS partitions on each potential secondary host under consideration to ensure that the addition of a virtual machine, for example a virtual machine mirrored from the primary host computer, would not have an undue impact on the performance of existing virtual machines on each of the queried potential secondary hosts. Thus, a potential secondary host computer that has resource utilization data within a defined performance threshold is selected to act as the secondary host.

In an alternative embodiment, collected VIOS cluster data is used to assess the suitability of future secondary hosts, as well as to aid in the selection of a current secondary host. As used herein, a "future secondary host" is another host in the network that will become the secondary host in the event of the failure of the primary host. For example, in the event of the failure of the primary host, a currently designated secondary host is established as the new primary host, for a given virtual machine, and the future secondary host becomes the new secondary host. The original primary-secondary host pair may have been selected, in part, because of a good network link between the original primary-secondary host pair. However, once the primary host fails and the secondary host is established as the new primary host, the options for selecting a new secondary host may be limited. For example, this may be due to a poor bandwidth connection between the new primary host and potential new secondary hosts. To prevent such a situation, network topology data and corresponding network latency data is collected by the VIOS cluster for each link in the computer network's topology. Such data can be used to analyze each potential primary-secondary host pair within the computer network 300 to determine an ideal initial primary-secondary host pair. Moreover, an analysis of the network topology and corresponding latency data for each potential primary-secondary host pair within the computer network 300 can be used to determine a new ideal primary-secondary host pair to implement in the event of the subsequent failure of the initial primary host. Thus, the selection of ideal primary-secondary host pairs is performed proactively, resulting in a preservation of the high-availability nature of each subsequent primary-secondary host pair.

As an example of using latency as the primary criteria for selection of the primary-secondary host pair, consider the various possible network links between each data processing system, as shown in FIG. 3. Also, consider that the minimum network latency is from DPS1 302 to DPS2 310, while the latency from DPS2 310 to either of DPS3 318 or DPS4 326 is the same, and greater than the latency from DPS1 302 to DPS2 310. In this example, DPS1 302 would be designated as the initial primary host and DPS2 310 is designated as the initial secondary host. At the same time, a future secondary host, for example one of DPS3 318 or DPS4 326, can also be designated. Since the latency from DPS2 310 to either of DPS3 318 or DPS4 326 is the same, a secondary criteria can be used to distinguish between DPS3 318 and DPS4 326. For example, if DPS3 318 has a resource utilization past a defined performance threshold, while DPS4 326 has a resource utilization within the defined performance threshold, then DPS4 326 is chosen as the future secondary host. Thus, in the event of a failure of the initial primary host DPS1 302, the initial secondary host DPS2 310 is designated as the new primary host, and the future secondary host DPS4 326 is designated as the new secondary host.

The VIOS cluster data can also be used to decide if a performance gain from near optimal usage of the computer network 300 is sufficient to justify an initial migration of the primary host to another location within the computer network 300. For example, each potential primary-secondary host pair in the computer network 300 can be analyzed using performance metrics, such as network latency, available network resources, network topology, and resource utilization data, among others. Although such migration could incur a large initial overhead, the usage of computer network 300 may be significantly optimized, as the new location to which the original primary host is migrated may provide improved network links to other potential secondary hosts. In contrast, if the primary host is simply placed arbitrarily within the computer network 300, then the checkpoint-based high-availability nature of a given primary-secondary host pair may be suboptimal as compared to careful placement of the primary host.

At times throughout the discussion of FIG. 3 above, specific reference was made to using DPS1 302 as the primary host computer, for example, for a virtual machine such as LPAR1 304 (VM1) running on DPS1 302. However, this specific reference was only made for purposes of describing the various embodiments, and it will be understood that any of data processing systems DPS1 302, DPS2 310, DPS3 318, and DPS4 326 within the computer network 300 may be equivalently designated as the primary or secondary host computer. Furthermore, while four data processing systems have been illustrated in FIG. 3, the embodiments as described herein are equally applicable to any number of data processing systems within the computer network 300.

Figure 4:
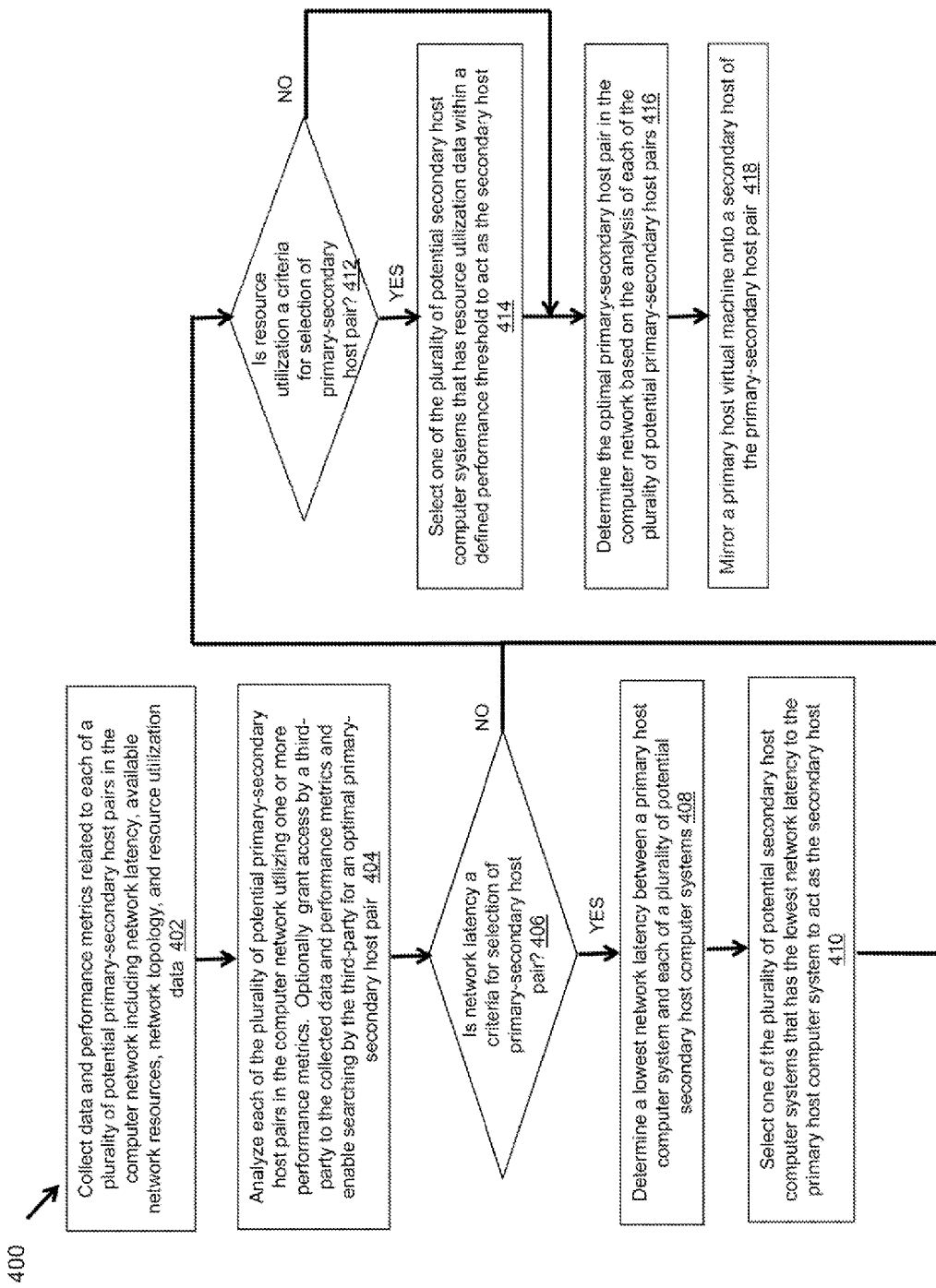
FIG. 4 provides a flowchart of an exemplary process for selecting an ideal primary-secondary host computer system pair in a computer network according to one embodiment.

FIG. 4 illustrates a flowchart of an exemplary process for selecting an ideal primary-secondary host computer system pair in a computer network according to an illustrative embodiment. In the discussion of FIG. 4, reference is also made to elements described in FIG. 1, FIG. 2 and FIG. 3. Computer implemented method 400 can be implemented in primary host DPS 100 in conjunction with secondary host 102 and network 140. Computer implemented method 400 can also be implemented in any of data processing systems DPS1 302, DPS2 310, DPS3 318, and DPS4 326 within the computer network 300 and in conjunction the network 140. In some embodiments, computer implemented method 400 is implemented by a pair selection module, such as pair selection modules 309, 317, 325, and 333, which executes at the virtual processor within the VIOS logical partition to perform functions related to the selection of the primary-secondary host pair for mirroring virtual machines, as described herein.

Method 400 starts with the collection of data and performance metrics related to each of a plurality of potential primary-secondary host pairs in a computer network (402), such as the computer network 300. The data and performance metrics are collected by a VIOS cluster, such as the set of virtual I/O servers (VIOS1, VIOS2, VIOS3, and VIOS4) that communicate with each other over the network 140. Also, the data and performance metrics include network latency, available network resources, network topology, and resource utilization, among others. In some embodiments, the performance metrics are stored in the storage device 150 and provided to each of VIOS1, VIOS2, VIOS3, and VIOS4, where the performance metrics are then stored in the VIOS local storage (LS), for the purpose of providing a continuity of services in the event of a virtual machine failure or a hardware failure.

Each of the plurality of potential primary-secondary host pairs in the computer network is analyzed by the pair selection module, which executes at the processor, utilizing one or more performance metrics (404). In some embodiments, an application programming interface (API) is provided to grant access to the third-party to data collected by the VIOS cluster and thus enable searching by the third-party for the ideal primary-secondary host pair.

If network latency is determined to be an important criteria for selection of the primary-secondary host pair (406), then the lowest network latency between a primary host computer system and each of a plurality of potential secondary host computer systems is determined (408), for example by the pair selection module. The pair selection modules also select one of the plurality of potential secondary host computer systems to act as the secondary host (410). The selected one of the plurality of potential secondary host computer systems has the lowest network latency to the primary host computer system.

If network latency is not an important criteria for selection of the primary-secondary host pair (406), then resource utilization is considered as another criteria for selection of the primary-secondary host pair (412). If resource utilization is not an important criteria, then the pair selection module determines the ideal primary-secondary host pair (416), and a primary host virtual machine is mirrored onto a secondary host of the primary-secondary host pair (418). Alternatively, if resource utilization is an important criteria for selection of the primary-secondary host pair (412), then the pair selection module selects one of the plurality of potential secondary host computer systems that has resource utilization data within a defined performance threshold to act as the secondary host (414). Thereafter, the pair selection module determines the ideal primary-secondary host pair (416), and a primary host virtual machine is mirrored onto a secondary host of the primary-secondary host pair (418).

However, if network latency is determined to be an important criteria for selection of the primary-secondary host pair (406) and if resource utilization is subsequently determined to also be an important criteria for selection of the primary-secondary host pair (412), then the pair selection module considers both of these criteria to determine the ideal primary-secondary host pair (416). For example, given two potential primary-secondary host pairs having equal latency, the pair selection module can use the resource utilization criteria to distinguish between the otherwise identical potential primary-secondary host pairs and thus determine the ideal primary secondary host pair (416), and the primary host virtual machine can be mirrored onto a secondary host of the primary-secondary host pair (418).

Figure 5:
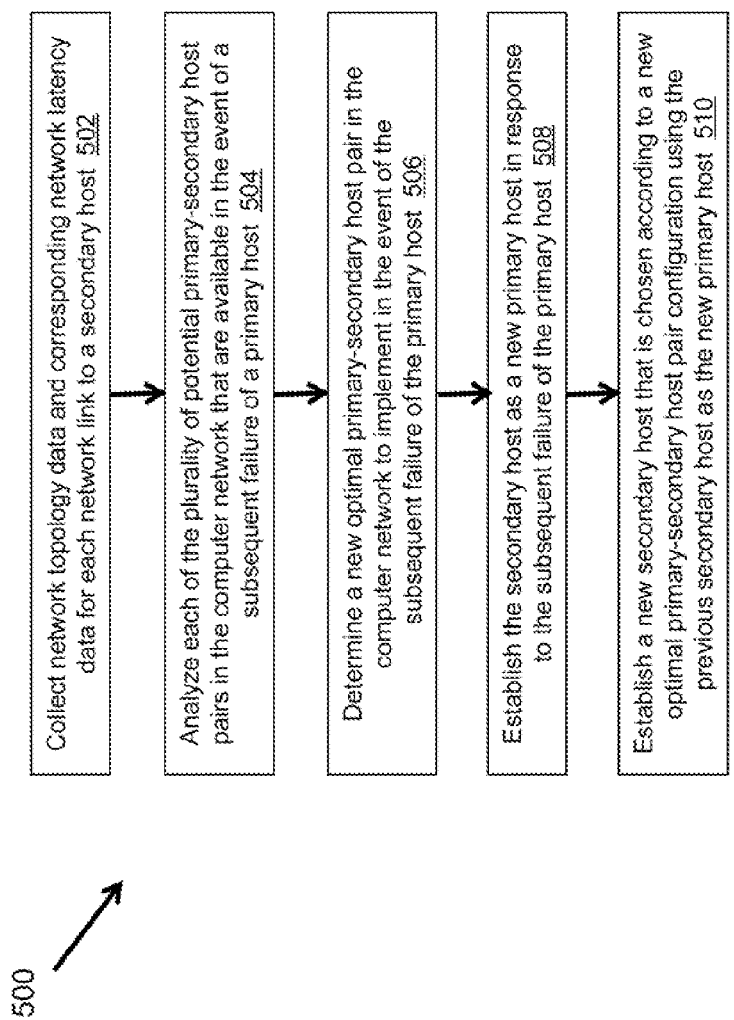
FIG. 5 provides a flowchart of an exemplary process for assessing the suitability of future primary-secondary host computer system pairs in a computer network according to one embodiment.

FIG. 5 illustrates a flowchart of an exemplary process for assessing the suitability of future primary-secondary host computer system pairs in a computer network according to an illustrative embodiment. In the discussion of FIG. 5, reference is also made to elements described in FIG. 1, FIG. 2 and FIG. 3. Computer implemented method 500 can be implemented in primary host DPS 100 in conjunction with secondary host 102 and network 140. Computer implemented method 500 can also be implemented in any of data processing systems DPS1 302, DPS2 310, DPS3 318, and DPS4 326 within the computer network 300 and in conjunction the network 140. In some embodiments, computer implemented method 500 is implemented by a pair selection module, such as pair selection modules 309, 317, 325, and 333, which executes at the virtual processor within the VIOS logical partition to perform functions related to the selection of the primary-secondary host pair for mirroring virtual machines, as described herein.

Method 500 starts with the collection of network topology data and corresponding network latency data for each network link to a secondary host (502). The network topology data and corresponding network latency data are collected by a VIOS cluster, such as the set of virtual I/O servers (VIOS1, VIOS2, VIOS3, and VIOS4) that communicate with each other over the network 140. In some embodiments, the network topology data and corresponding network latency data are stored in the storage device 150 and provided to each of VIOS1, VIOS2, VIOS3, and VIOS4, where the data is then stored in the VIOS local storage (LS), for the purpose of providing a continuity of services in the event of a virtual machine failure or a hardware failure.

Each of the plurality of potential primary-secondary host pairs in the computer network that are available in the event of a subsequent failure of the primary host are analyzed (504), for example by the pair selection module which executes at the processor. Thereafter, a new ideal primary-secondary host pair in the computer network to implement in the event of the subsequent failure of the primary host is determined by the pair selection module (506). The secondary host is established as the new primary host in response to the subsequent failure of the primary host (508), and a new secondary host is established (510). The new secondary host is chosen according to a new ideal primary-secondary host pair configuration using the previous secondary host as the new primary host.

By using performance metrics to intelligently determine the ideal primary-secondary host pair, a high-availability computer system can realize performance and reliability gains that are not achievable when selecting a primary-secondary host pair based simply on whether a secondary computer has sufficient resources to support a virtual machine.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system comprising:
   at least one memory having a set of instructions located therein; and
   at least one processor in communication with the at least one memory, the at least one processor operable to execute the set of instructions which cause the at least one processor to:
   prior to failure of a primary host in the computer network:
      collect data related to each of a plurality of potential primary-secondary host pairs from among a plurality of host devices in the computer network;
      analyze each of the plurality of potential primary-secondary host pairs in the computer network utilizing a plurality of performance metrics, including bandwidth and distance between the hosts of each primary-secondary host pair of the plurality of potential primary-secondary host pairs, to discover performance and reliability gains achievable for each potential primary-secondary host pair;

determine an ideal primary-secondary host pair in the computer network based on the analysis of each of the plurality of potential primary-secondary host pairs, wherein the ideal primary-secondary host pair comprises the primary host and a secondary host paired with the primary host;

in response to the determination of the ideal primary-secondary host pair from among the plurality of potential primary-secondary host pairs, mirror a primary host virtual machine of the primary host of the ideal primary-secondary host pair onto the secondary host of the ideal primary-secondary host pair; and select a future secondary host from among the plurality of hosts in the computer network that will become the secondary host of the ideal primary-secondary host pair the event of the failure of the primary host.

2. The data processing system of claim 1, wherein the plurality of performance metrics comprise metrics selected from a group comprising network latency, available network resources, network topology, and resource utilization data.

3. The data processing system of claim 1, further comprising instructions that cause the at least one processor to:
determine a lowest network latency between the primary host and each of a plurality of potential secondary hosts; and
responsive to the determination of the lowest network latency, select one host from among the plurality of potential secondary hosts having the lowest network latency to the primary host as the secondary host of the ideal primary-secondary host pair.

4. The data processing system of claim 1, further comprising instructions that cause the at least one processor to:
collect resource utilization data for each of a plurality of potential secondary hosts; and
select one host from among the plurality of potential secondary hosts having a resource utilization data within a defined performance threshold as the secondary host of the ideal primary-secondary host pair.

5. The data processing system of claim 1, further comprising instructions that cause the at least one processor to:
collect network topology data and corresponding network latency data for each network link to the secondary host of the ideal primary-secondary host pair;
in response to the collection of the network topology data and the corresponding network latency data, analyze each of the plurality of potential primary-secondary host pairs that are available in the event of subsequent failure of the primary host; and
determine a new ideal primary-secondary host pair in the computer network to implement in the event of subsequent failure of the primary host.

6. The data processing system of claim 5, wherein the new ideal primary-secondary host pair comprises a new primary host and a new secondary host, and wherein a primary host of the new ideal primary-secondary host pair is the secondary host of the ideal primary-secondary host pair, the instructions further comprising instructions that cause the at least one processor to:
in response to failure of the primary host:
establish the secondary host of the ideal primary-secondary host pair as the primary host; and
establish the new secondary host of the new ideal primary-secondary host pair configuration as the secondary host.

7. The data processing system of claim 1, wherein the primary host and the secondary host of the ideal primary-secondary host pair are virtual hosts in a cloud-based computing environment, and wherein the at least one processor is a virtual processor resource of a physical processor.

8. The data processing system of claim 1, wherein:
the collected data is accessed via an application programming interface (API) of a remote memory storage device and the remote memory storage device stores the collected data of each host in the computer network; and
the instructions further comprising instructions that cause the at least one processor to search, via the API, the collected data for the ideal primary-secondary host pair.

9. The data processing system of claim 1, wherein:
the future secondary host is determined based on an analysis of network topology data and corresponding network latency data of each link in the computer network; and
the instructions further comprising instructions that cause the at least one processor to:
in response to failure of the primary host:
establish the secondary host of the ideal primary-secondary host pair as the primary host; and
establish the future secondary host as the secondary host.

10. The data processing system of claim 1, further comprising instructions that cause the at least one processor to:
in response to analyzing each of the plurality of potential primary-secondary host pairs in the computer network utilizing the performance metrics, determine, whether a performance gain from near optimal usage of the computer network is sufficient to justify a migration of the primary host to another location within the computer network; and
in response to determining the migration of the primary host to another location within the computer network would significantly optimize usage of the computer network and provide improved network links to the primary host to one or more potential secondary hosts, migrate the primary host to the another location.

11. A non-transitory computer readable storage medium comprising program code that when executed by a computer processor, provides the functionality of:
prior to failure of a primary host in a computer network:
collecting data related to each of a plurality of potential primary-secondary host pairs from among a plurality of host devices in the computer network;
analyzing each of the plurality of potential primary-secondary host pairs in the computer network utilizing a plurality of performance metrics, including bandwidth and distance between the hosts of each primary-secondary host pair of the plurality of potential primary-secondary host pairs, to discover performance and reliability gains achievable for each potential primary-secondary host pair;
determining an ideal primary-secondary host pair in the computer network based on the analysis of each of the plurality of potential primary-secondary host pairs, wherein the ideal primary-secondary host pair comprises the primary host and a secondary host paired with the primary host;
in response to determining the ideal primary-secondary host pair from among the plurality of potential primary-secondary host pairs, mirroring a primary host virtual machine of the primary host of the ideal primary-secondary host pair onto the secondary host of the ideal primary-secondary host pair; and
selecting a future secondary host from among the plurality of hosts in the computer network that will become the secondary host of the ideal primary-secondary host pair the event of the failure of the primary host.

12. The non-transitory computer readable storage medium of claim 11, wherein the performance metrics comprise metrics selected from a group comprising network latency, available network resources, network topology, and resource utilization data.

13. The non-transitory computer readable storage medium of claim 11, further comprising program code that when executed by the computer processor, provides the functionality of:
    determining a lowest network latency between the primary host and each of a plurality of potential secondary hosts; and
    in response to determining the lowest network latency, selecting one host from among the plurality of potential secondary having the lowest network latency to the primary host as the secondary host of the ideal primary-secondary host pair.

14. The non-transitory computer readable storage medium of claim 11, further comprising program code that when executed by the computer processor, provides the functionality of:
    collecting resource utilization data for each of a plurality of potential secondary hosts; and
    selecting one host from among the plurality of potential secondary hosts having a resource utilization data within a defined performance threshold as the secondary host of the ideal primary-secondary host pair.

15. The non-transitory computer readable storage medium of claim 11, further comprising program code that when executed by the computer processor, provides the functionality of:
    collecting network topology data and corresponding network latency data for each network link to the secondary host of the ideal primary-secondary host pair;
    responsive to collecting the network topology data and the corresponding network latency data, analyzing each of the plurality of potential primary-secondary host pairs that are available in the event of subsequent failure of the primary host;
    determining a new ideal primary-secondary host pair in the computer network to implement in the event of subsequent failure of the primary host, wherein the new ideal primary-secondary host pair comprises a new primary host and a new secondary host, and wherein a primary host of the new ideal primary-secondary host pair is the secondary host of the ideal primary-secondary host pair, the instructions; and
    in response to the subsequent failure of the primary host:
        establishing the secondary host of the ideal primary-secondary host pair as the primary host; and
        establishing the new secondary host of the new ideal primary-secondary host pair as the secondary host.

16. The non-transitory computer readable storage medium of claim 11, further comprising program code that when executed by the computer processor, provides the functionality of:
    granting access by a third-party to data related to each of the plurality of potential primary-secondary host pairs in the computer network; and
    enabling selection by the third-party of the ideal primary-secondary host pair.

17. The non-transitory computer readable storage medium of claim 11, wherein the primary host and the secondary host of the ideal primary-secondary host pair are virtual hosts in a cloud-based computing environment, and wherein the computer processor is a virtual processor resource of a physical processor.

18. The non-transitory computer readable storage medium of claim 11, wherein:
    the collected data is accessed via an application programming interface (API) of a remote memory storage device and the remote memory storage device stores the collected data of each host in the computer network; and
    the program code further comprising program code that when executed by the computer processor, provides the functionality of searching, via the API, the collected data for the ideal primary-secondary host pair.

19. The non-transitory computer readable storage medium of claim 11, wherein:
    the future secondary host is determined based on an analysis of network topology data and corresponding network latency data of each link in the computer network; and
    the program code further comprising program code that when executed by the computer processor, provides the functionality of:
        performing an analysis of network topology data and corresponding network latency data of each link in the computer network; and
        in response to failure of the primary host:
            establishing the secondary host of the ideal primary-secondary host pair as the primary host; and
            establishing the future secondary host as the secondary host.

20. The non-transitory computer readable storage medium of claim 11, further comprising instructions that cause the at least one processor to:
    in response to analyzing each of the plurality of potential primary-secondary host pairs in the computer network utilizing the performance metrics, determining, whether a performance gain from near optimal usage of the computer network is sufficient to justify a migration of the primary host to another location within the computer network; and
    in response to determining the migration of the primary host to another location within the computer network would significantly optimize usage of the computer network and provide improved network links to the primary host to one or more potential secondary hosts, migrating the primary host to the another location.

* * * * *